United States Patent
Burns et al.

(10) Patent No.: US 6,701,828 B1
(45) Date of Patent: Mar. 9, 2004

(54) AUTOMATIC COOKIE PRESS

(75) Inventors: Clay Burns, New York, NY (US); Rick Shonfeld, High Peak (GB); Yvonne Lin, Brooklyn, NY (US); Kevin Lozeau, Ridge, NY (US)

(73) Assignee: Wilton Industries, Inc., Woodridge, IL (US)

( * ) Notice: Subject to any disclaimer, the term of this patent is extended or adjusted under 35 U.S.C. 154(b) by 0 days.

(21) Appl. No.: 10/315,423

(22) Filed: Dec. 10, 2002

(51) Int. Cl.[7] .............................. A23L 1/00; A23P 1/00; A21C 9/00
(52) U.S. Cl. .................. 99/450.2; 99/450.1; 99/494; 222/326; 222/333; 222/390; 425/376.1; 425/449
(58) Field of Search ............................. 99/450.2, 450.1, 99/494; 222/327, 390, 326, 333, 63, 134, 386; 425/376.1, 449, 448, 191, 256, 154, 227, 544; 401/145–153, 164, 172, 194, 195; 403/322.1, 316, DIG. 4; 426/516; 192/125 A; 141/18, 85, 98; 74/424.78, 89.34

(56) References Cited

U.S. PATENT DOCUMENTS

| 3,208,638 | A | | 9/1965 | Frenzel et al. |
| D238,243 | S | | 12/1975 | Polivka |
| 3,984,033 | A | | 10/1976 | Groth et al. |
| D247,414 | S | | 3/1978 | Watkins et al. |
| 4,106,534 | A | | 8/1978 | Johnson |
| 4,114,781 | A | | 9/1978 | Doyel |
| 4,322,022 | A | | 3/1982 | Bergman |
| 4,335,834 | A | | 6/1982 | Zepkin |
| 4,350,458 | A | | 9/1982 | Murahara et al. |
| 4,360,332 | A | * | 11/1982 | Cyin ............................ 425/191 |
| 4,583,934 | A | * | 4/1986 | Hata et al. ................. 425/376.1 |
| 4,702,687 | A | * | 10/1987 | Wheeler et al. ............. 425/227 |
| 4,815,961 | A | * | 3/1989 | Kindred ....................... 425/544 |
| D309,853 | S | | 8/1990 | Kolada et al. |
| 4,993,932 | A | * | 2/1991 | D'Andrade .................. 425/154 |
| 5,027,984 | A | | 7/1991 | Gakhar et al. |
| 5,052,593 | A | | 10/1991 | Grome et al. |
| 5,111,973 | A | * | 5/1992 | Mueller ........................ 222/386 |
| 5,207,357 | A | * | 5/1993 | Aronie et al. ................ 222/134 |
| 5,343,800 | A | * | 9/1994 | Wu ................................ 99/494 |
| 5,410,952 | A | * | 5/1995 | Liou .......................... 99/450.6 |
| 5,556,009 | A | | 9/1996 | Motzko |
| 5,762,239 | A | | 6/1998 | Cossette |
| 5,871,299 | A | | 2/1999 | Lai |
| 5,993,188 | A | * | 11/1999 | Mak ......................... 425/376.1 |
| 6,405,643 | B1 | * | 6/2002 | Moyses et al. ............. 99/450.4 |
| 6,457,400 | B1 | * | 10/2002 | Hutzler ......................... 99/345 |
| 6,467,403 | B1 | * | 10/2002 | Lagares-Corominas ...... 99/472 |

* cited by examiner

Primary Examiner—Timothy F. Simone
(74) Attorney, Agent, or Firm—Piper Rudnick LLP

(57) ABSTRACT

An apparatus that dispenses a food substance has a housing and a barrel removably connected to the housing. A rod connected to a plunger is disposed within the housing and the barrel. A drive mechanism including a dual-direction electric motor is located in the housing. The drive mechanism actuates the rod so that the plunger is advanced in the barrel to dispense the food substance. The drive mechanism includes a nut housing having an inner passage housing a nut positioned between a pair of compression springs. The nut is restricted from rotational movement relative to the nut housing but may move a limited distance vertically. The rod is positioned through the nut housing. The nut travels along the rod as the rod moves within the apparatus.

20 Claims, 7 Drawing Sheets

AUTOMATIC COOKIE PRESS

TECHNICAL FIELD OF THE INVENTION

The present invention relates in general to a cookie press, and more particularly to a hand held, battery operated automatic cookie press.

BACKGROUND OF THE INVENTION

Battery-operated, hand held cookie presses, that is, devices that dispense cookie dough, are known in the art. For example, U.S. Pat. No. 5,052,593 issued to Grome et al. is directed to a battery-operated hand-held cookie press that includes a sliding piston positioned within a barrel and removably mounted to a threaded rod. The barrel and piston cooperate to prevent the piston from turning within the barrel during advancement. The device includes a unidirectional electric motor and a gear train wherein the last gear has teeth that engage the teeth of a drive nut. The drive nut features threads that engage the threaded rod and is confined thereon. Upon completion of dispensing the cookie dough, the threaded rod and drive nut are removed from the device and, after cleaning, are flipped over and reinserted into the housing.

Another prior art cookie press apparatus is disclosed in U.S. Pat. No. 4,114,782 issued to Doyel. The Doyel patent illustrates a hand-held battery-operated cookie press. The cookie press includes a barrel with flattened sides and a piston with corresponding flattened sides. The piston is connected to a drive screw that is turned by a gear wheel having an internal thread. The gear wheel is driven by a gear train and a unidirectional electric motor.

The drive screw of the Doyel '782 patent is loaded through a central opening in the back of the device until the threads of the drive screw contact the internal threads of the gear wheel. Once the threads are in contact, the motor is activated to rotate the gear wheel. The user lightly pushes the end of the screw until the internal threads of the gear wheel and the drive screw engage. The cookie press extrudes cookie dough when the forward end of the screw is pushed against the piston. Upon completion of the dispensing or extrusion, the gear wheel travels off of the end of the drive screw. The drive screw is then removed from the barrel and the piston is removed from the drive screw. The drive screw is then reloaded via the opening on the back of the device as described above.

The battery-powered cookie press devices of the above two patents feature unidirectional motors. As a result, at the completion of a dispensing, the threaded rods or screws that drive their plungers or pistons must be removed and reinserted prior to the next dispensing. In each case the process is cumbersome and time consuming. Demand therefore exists for an automatic cookie press wherein the direction of travel of the threaded rod or screw may be reversed so that the cookie press may be "reset" for the next dispensing without manual removal and insertion of the drive rod or screw.

Therefore, it is an object of the present invention to provide an automatic cookie press where the direction of travel of the drive rod or screw may be reversed so that the device may be reset for dispensing without removal and/or reloading of the drive rod or screw.

SUMMARY OF THE INVENTION

The present invention is directed to an apparatus for dispensing a food substance, such as cookie dough. The apparatus includes a housing and a barrel removably connected to the housing. A rod is connected to a plunger. The plunger slides within the barrel. A drive mechanism located within the housing actuates the rod so that the plunger is advanced downward in the barrel. The drive mechanism includes a gear assembly and a nut housing having an inner passage. The nut housing is rotated in the housing via the gears of the gear assembly.

The nut housing houses a nut with outwardly protruding keys and a compression spring positioned on each side of the nut. The rod passes through the nut housing and engages the nut. The nut travels along the rod within the nut housing as the rod moves within the apparatus. The nut travels off of the threaded rod when the rod is fully extended and fully retracted. The springs in the nut housing urge the nut towards engagement with the threads of the rod in such situations so that the direction of travel of the rod may be reversed when the motor direction is reversed.

BRIEF DESCRIPTION OF THE DRAWINGS

Further aspects of the invention and their advantages may be discerned from the following description when taken in conjunction with the drawings, in which like characters number like parts and in which.

DETAILED DESCRIPTION

Figure 1:
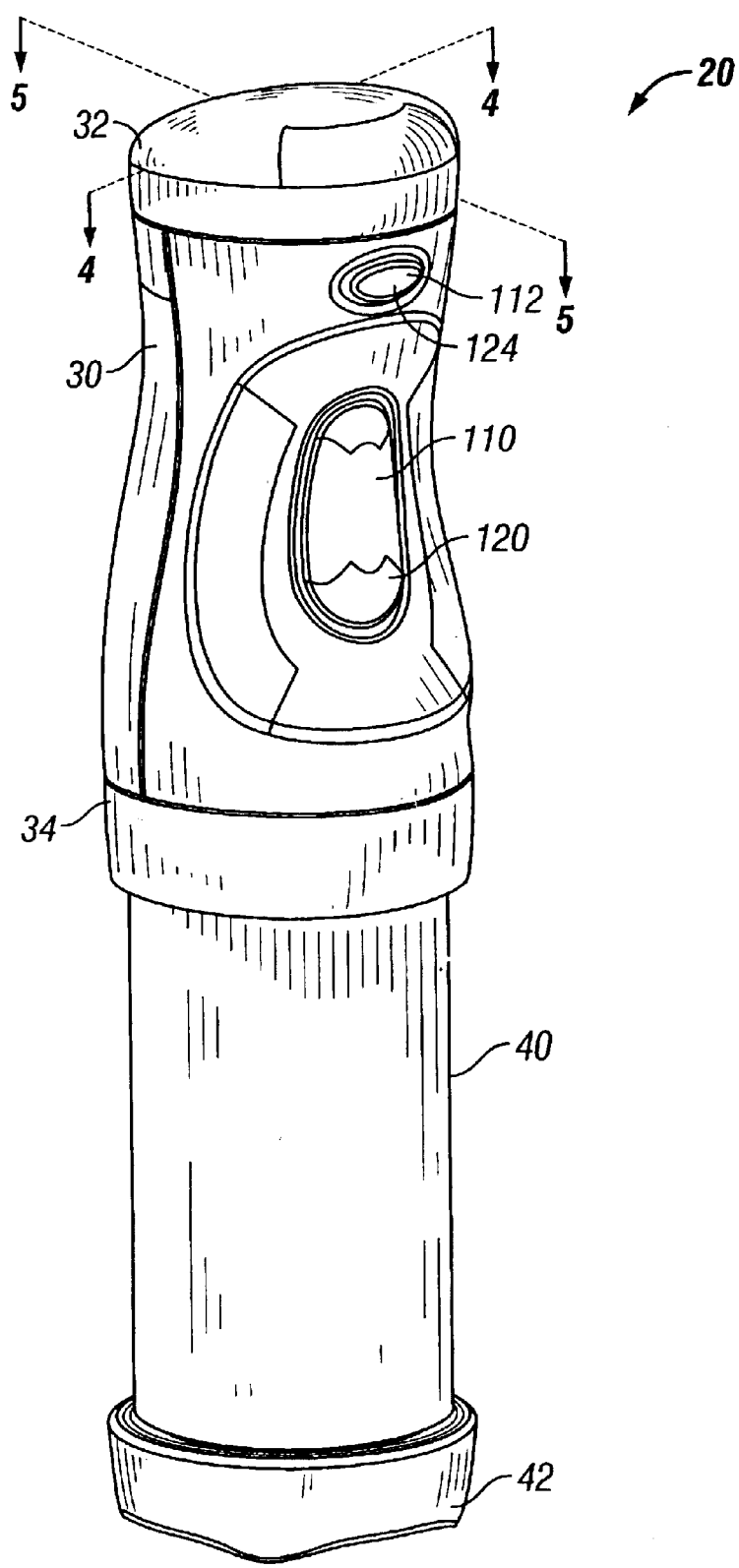
FIG. 1 is a perspective view of an embodiment of the automatic cookie press of the present invention.
Figure 2:
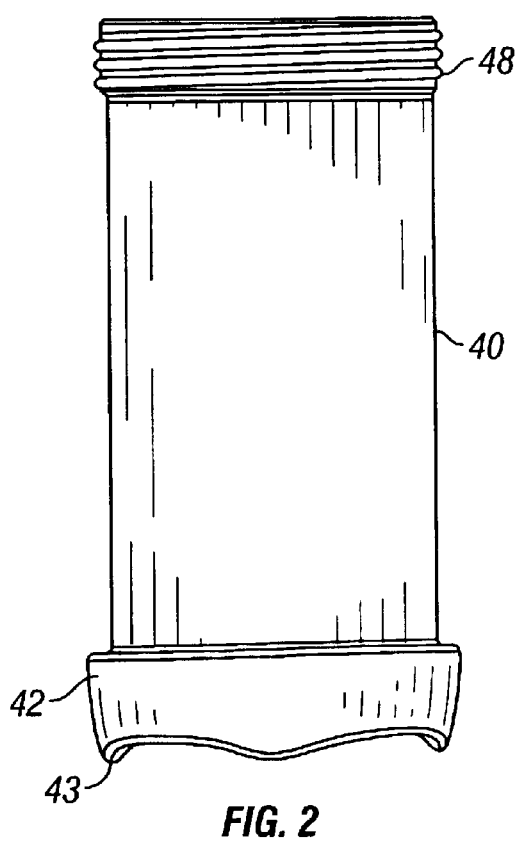
FIG. 2 is a side elevational view of the barrel of the automatic cookie press illustrated in FIG. 1.
Figure 4:
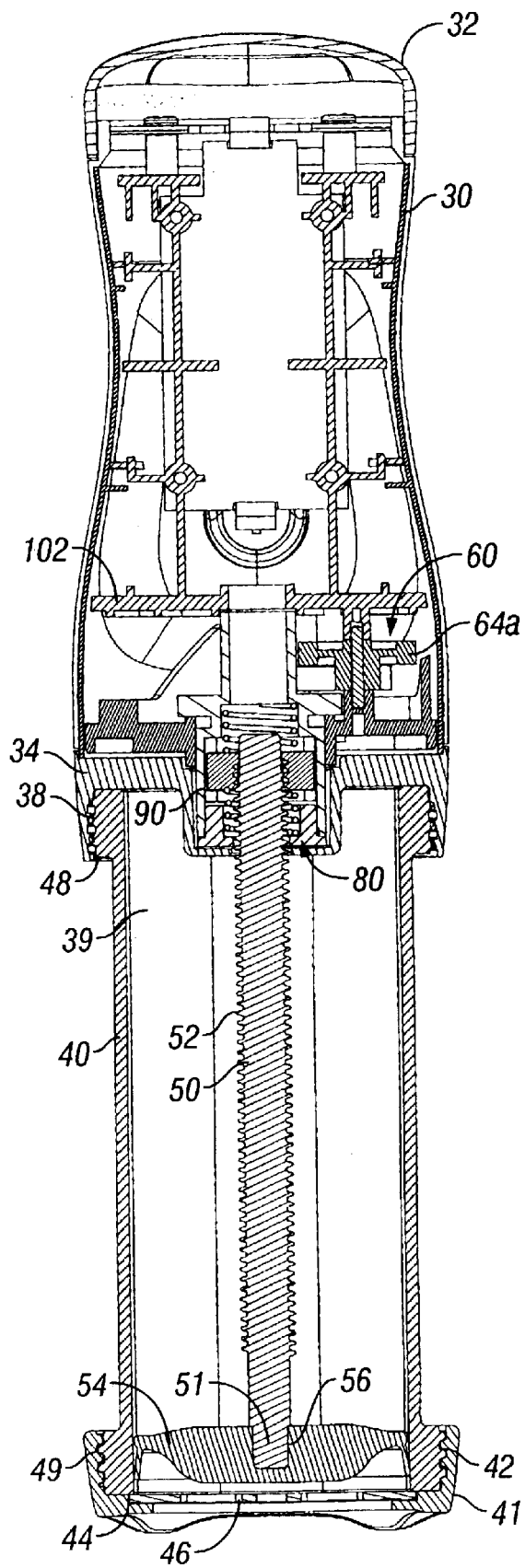
FIG. 4 is a cross sectional view of the automatic cookie press illustrated in FIG. 1 taken along line 4—4.
Figure 5:
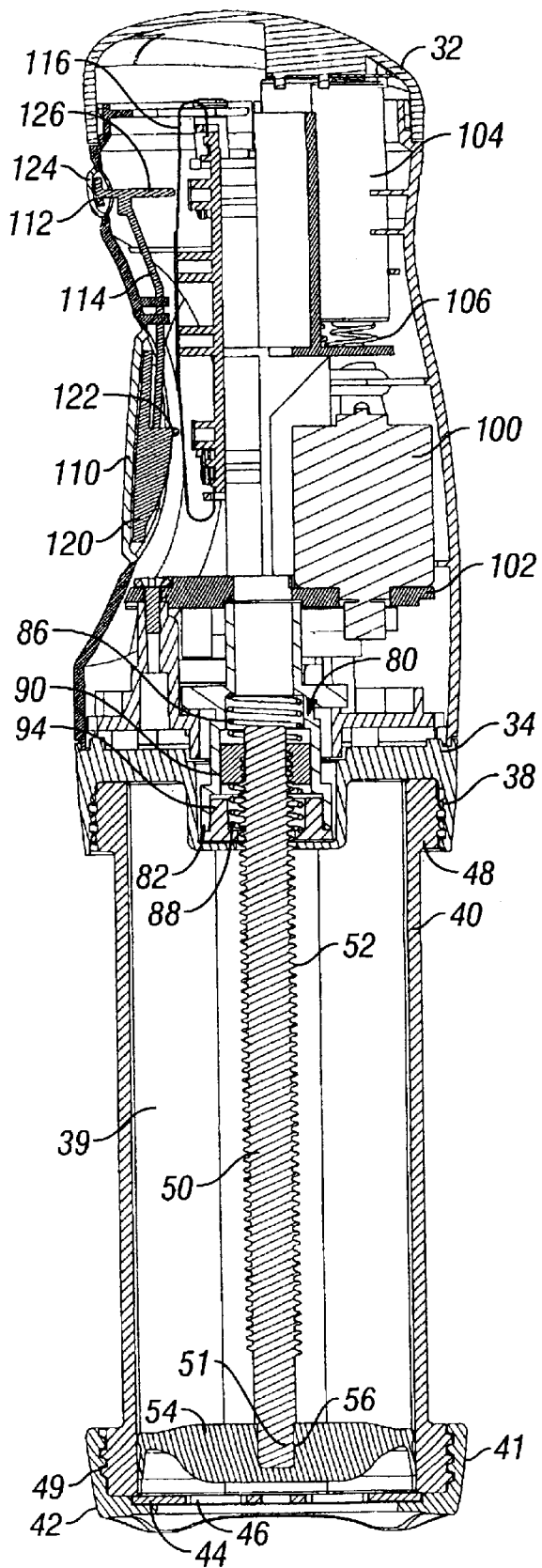
FIG. 5 is a cross sectional view of the automatic cookie press illustrated in FIG. 1 taken along line 5—5.

An embodiment of the automatic cookie press of the present invention is indicated in general at 20 in FIG. 1. The automatic cookie press 20 includes a housing 30 and a barrel 40 that is removably attached to the housing 30. The housing 30 is preferably constructed of plastic and serves as a handle for the device. The housing 30 has a top portion 32 and a bottom portion 34 and is shaped for easy gripping by a user. The bottom portion 34 includes annular threads 38 located along its inside surface (FIGS. 4 and 5). The annular threads 38 engage the annular threads 48 located at the top of the barrel 40, the latter of which are illustrated in FIG. 2. As a result, the barrel 40 is easily screwed to the bottom portion 34 of the housing 30.

Figure 3:
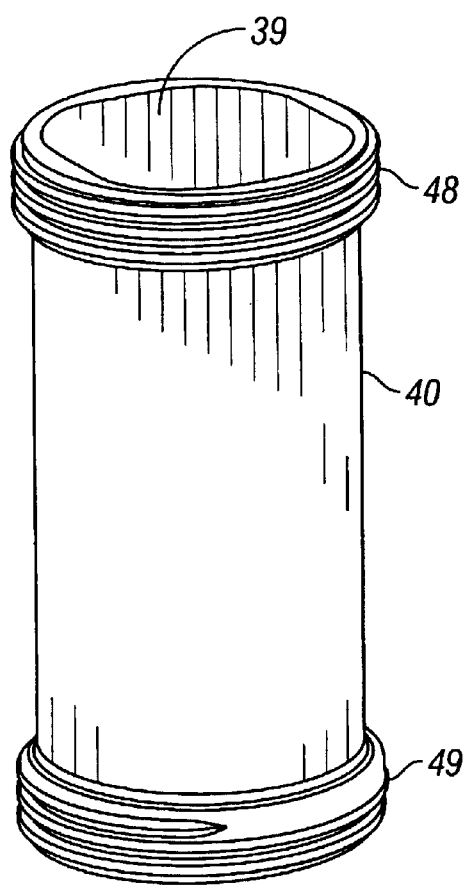
FIG. 3 is an exploded perspective view of the barrel of the automatic cookie press illustrated in FIG. 2.
Figure 3:
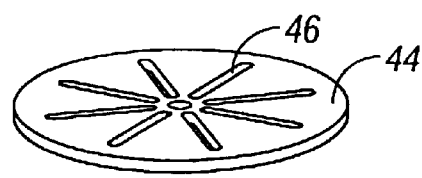
Figure 3:
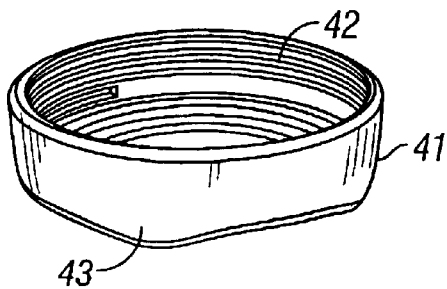

The removable barrel 40, illustrated in FIGS. 2 and 3, is preferably formed from a clear plastic material. The clear barrel allows the user to view the cookie dough as they are using the automatic cookie press. If desired, the barrel may also be formed from an opaque material.

Figure 6:
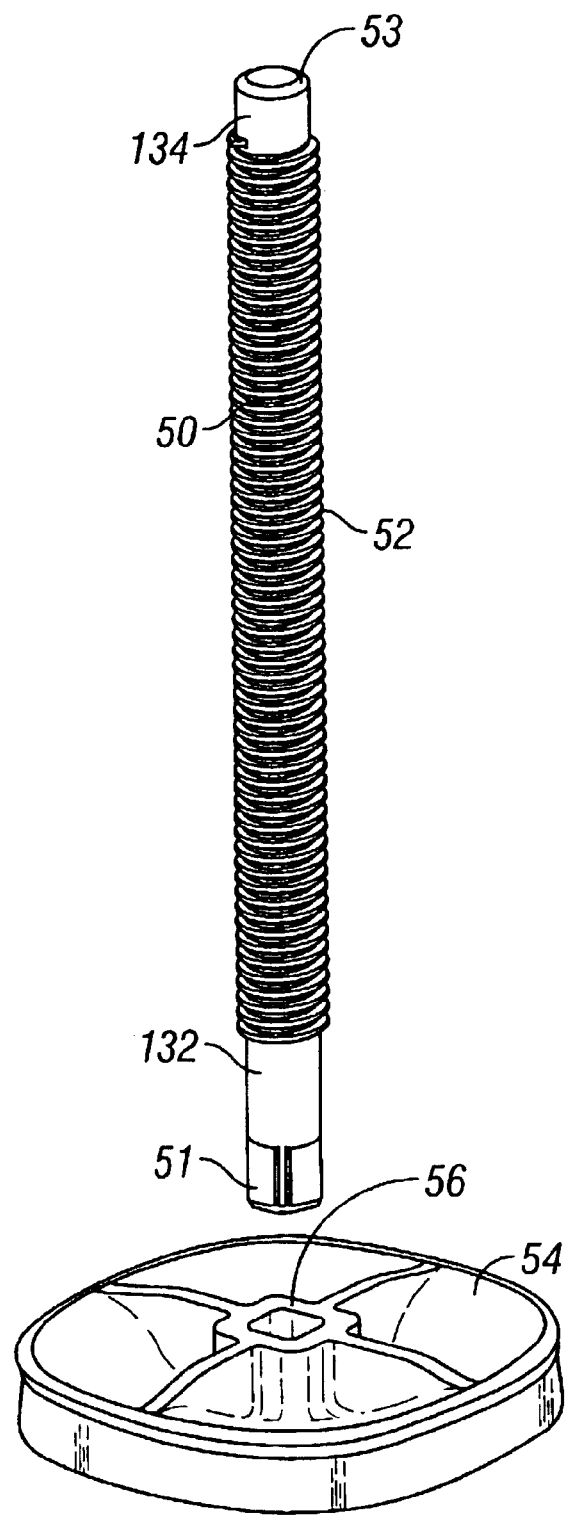
FIG. 6 is an exploded perspective view of the plunger and the center rod of FIGS. 4 and 5.

The barrel 40 features a bore, indicated at 39 in FIG. 3, that has a generally square cross section and mates with a square plunger 54 (FIG. 6). As will be explained below, the plunger is used to push the cookie dough out of the bore of the barrel. The bore is sized to allow the plunger 54 to slide in a vertical direction within the barrel 40. The square configuration of the bore prohibits the plunger 54 from rotating within the barrel 40.

As shown in FIG. 3, in addition to the annular threads 48 at the top of the barrel, the barrel 40 also includes annular threads 49 located at its bottom edge. As illustrated in FIGS. 4 and 5, the threads 49 at the bottom of the barrel engage the threads 42 located within the barrel cap 41. Barrel cap 41 is screwed onto the bottom end of the barrel. The threaded connection enables the barrel 40 and the barrel cap 41 to be easily removed from each other for cleaning or for refilling the automatic cookie press. The cap 41 also includes a plurality of feet 43. The feet 43 stabilize the automatic cookie press when placed on a counter top surface.

The cap 41 includes an opening there through. A disc 44 with openings 46 that form a template is positioned within the cap 41. More specifically, the disc 44 rests on the inside surface of the cap 41 covering the opening. When the cap 41 is secured to the barrel 40, the disc 44 abuts the bottom edge of the barrel 40. As a result, in use, the cookie dough is released from the automatic cookie press only though the openings 46 in the disc 44. The openings 46 dictate the shape or design of the cookie. The disc 44 used in the illustrated embodiment may be replaced by a variety of discs that have different templates thereby enabling the user to form cookies having various shapes and designs.

As illustrated in FIGS. 1 and 5 the automatic cookie press also includes advance button 110, retract button 112 with a lever 114 positioned therebetween within the housing 30. The buttons 110 and 112 are disposed within a surface of the housing, preferably the front surface, such that a portion of button 110 and button 112 extends outwardly from the housing 30. The buttons 110 and 112 include front surfaces 120 and 124, respectively, and, as illustrated in FIG. 5, back surfaces having tabs 122 and 126 mounted thereon.

FIGS. 4 and 5 are cross sectional views that illustrate the inside of the assembled automatic cookie press. The housing 30 contains the batteries 104, a dual-direction electric motor 100 and a chassis 102. The chassis 102 provides the frame work for the batteries 104 which provide the power to operate the motor 100 when buttons 110 and 112 are manipulated. More specifically, when a button is depressed, either tab 122 or 126 engages the switch block assembly 116 so that the appropriate circuit is closed and motor 100 is energized.

The housing 30 also includes the drive mechanism that actuates the center rod 50 and the plunger 54 used to push the cookie dough out of the automatic cookie press. The drive mechanism is driven by the motor 100. As illustrated in FIG. 4, the drive mechanism includes a gear assembly 60 and a nut assembly 80. The gear assembly will be discussed with reference to FIGS. 7 and 8 and the nut assembly will be discussed with reference to FIGS. 9 and 10.

With reference to FIGS. 4 and 5, the plunger 54 has a square configuration and is sized so that it may slide up and down within the bore 39 of barrel 40. An enlarged view of the plunger 54 and center rod 50 are illustrated in FIG. 6. The center rod 50 is connected to the plunger 54 by a socket arrangement. More specifically, the plunger 54 includes a square opening or hole 56 located within its center. One end of the center rod 50 has a square section 51 that is sized to fit within the hole or opening 56 in the plunger 54. The connection between the plunger 54 and the center rod 50 prevents the center rod 50 from rotating with respect to the plunger 54. Alternatively, the plunger 54 and the center rod 50 may be constructed as a single piece or otherwise secured together in a fixed fashion. There are non-threaded portions of the rod between the threads 52 and the square section 51 and the threads and the top of the rod, indicated at 132 and 134, respectively.

The center rod 50 is cylindrical except for the square section 51 at the lower portion of the rod 50. External threads 52 extend over a substantial portion of the rod 50. As shown in FIGS. 4 and 5, the rod is situated within the nut assembly 80 in the housing 30. The nut 90 located in the nut assembly 80 engages the external threads 52 of the center rod 50.

Figure 7:
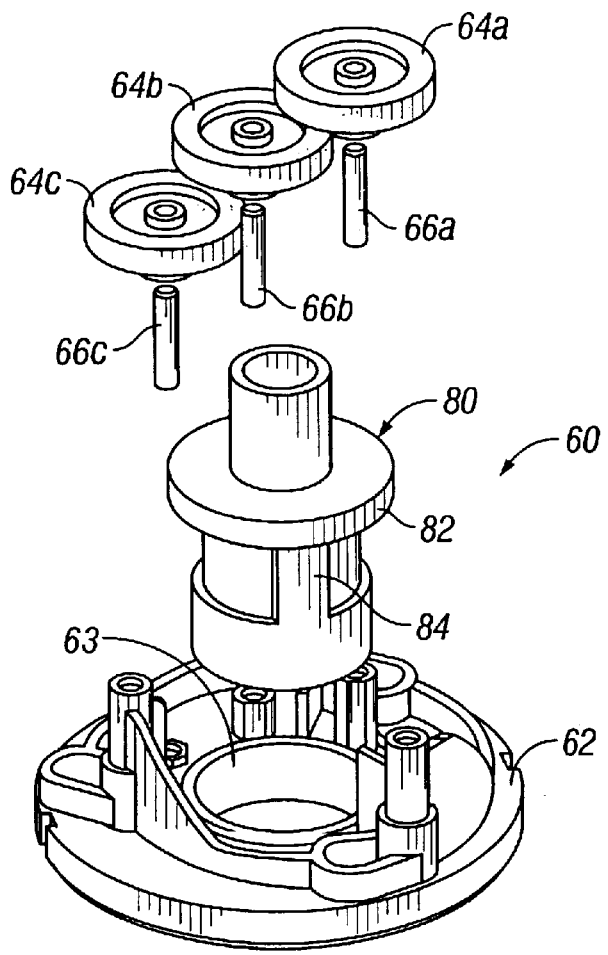
FIG. 7 is an exploded perspective view of the gear box assembly of the drive mechanism of FIGS. 4 and 5.
Figure 8:
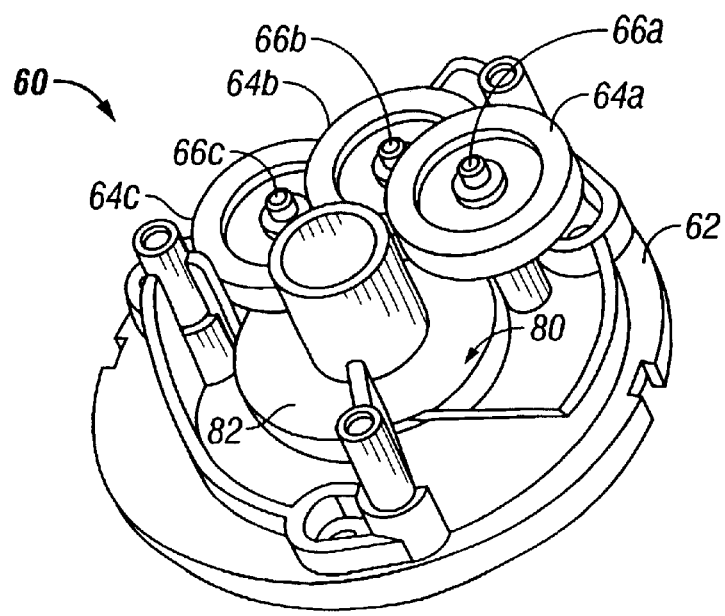
FIG. 8 is a top perspective view of the assembled gear box assembly of FIG. 7.

As shown in FIGS. 7 and 8, the gear assembly 60 includes gear housing 62 with a circular opening 63 located at the center of the gear housing 62. The gear assembly 60 also includes gears 64a–64c that are assembled to the gear housing via pins 66a–66c. In the preferred embodiment, the gear assembly 60 includes three gears, however, the gear assembly 60 may be designed with gears varying in size and number. The nut assembly 80 includes a nut housing 82 that is disposed in a rotating fashion within the opening 63 in the gear housing 62 when assembled, as illustrated in FIG. 8, gear 64c contacts the nut housing 82. In operation, the motor 100 (FIG. 5) activates the gear 64a, which in turn activates gears 64b and 64c, the latter of which rotates the nut housing 82 and its contents. The nut housing 82 and the nut 90 rotate at an angular velocity dictated by the sizing of the gears 64a–64c of the gear box assembly 60.

Figures 9, 10:
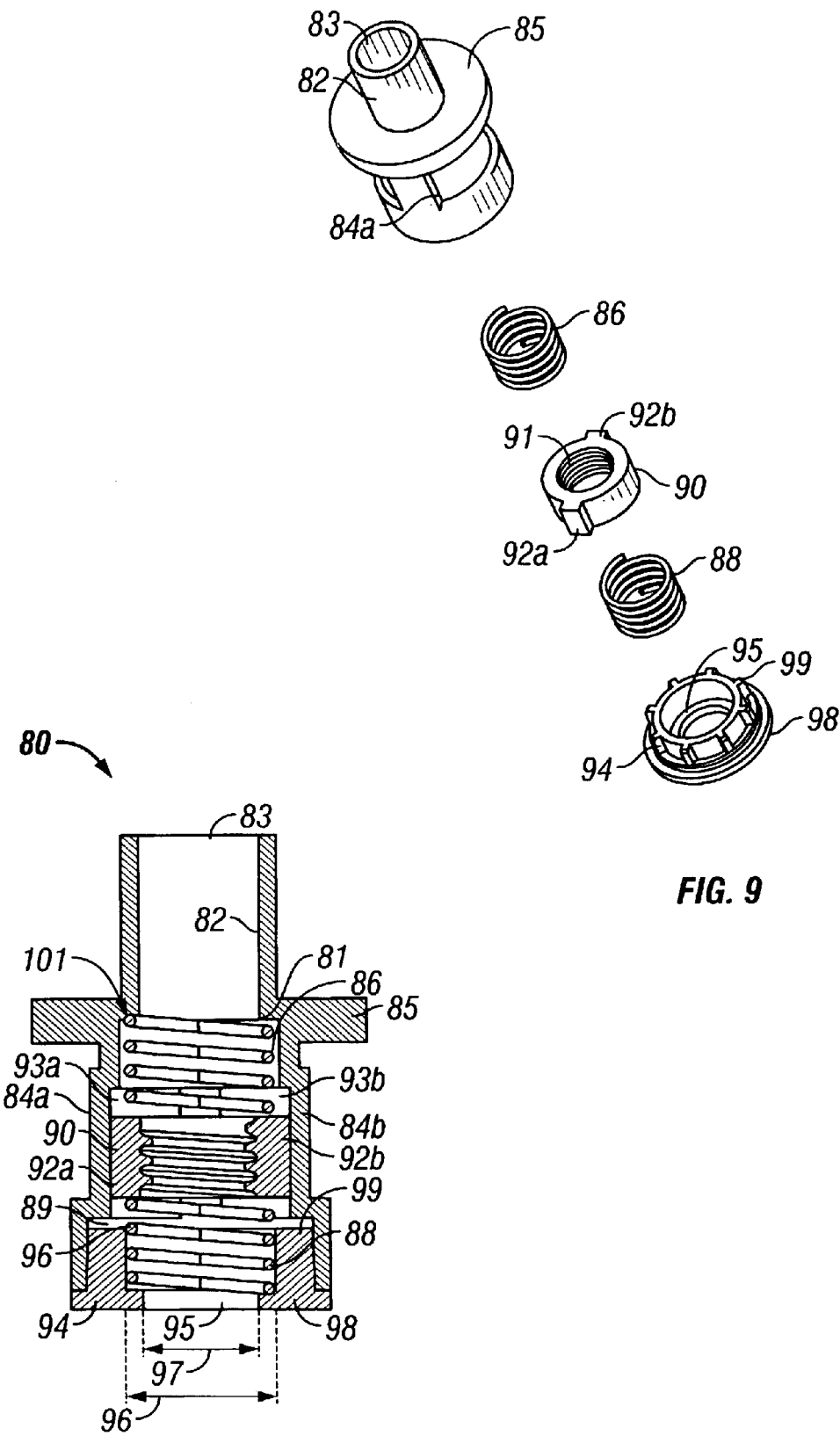
FIG. 9 is an exploded view of the nut assembly of FIGS. 4 and 5.
FIG. 10 is an enlarged view of the assembled nut assembly of FIG. 5.

As shown in FIGS. 9 and 10, the nut assembly 80 includes a nut housing 82 which houses the remaining members of the nut assembly. The nut housing 82 features a cylindrical inner passage 83 including an annular shoulder 81. The nut housing 82 also includes an outwardly extending annular collar 85 and a pair of outwardly extending portions 84a and 84b. In the preferred embodiment, the portions 84a and 84b are located opposite one another. The bottom of the nut housing 82 includes an opening 89 (FIG. 10). The opening 89 is sized to receive a nut housing cap 94.

As illustrated in FIG. 9, the nut housing cap 94 is generally circular with a passage 95. As illustrated in FIG. 10, the passage 95 has an inner diameter 96 at the top of the cap and an outer diameter 97 at the bottom of the cap. The nut housing cap 94 has an outer rim 98 and a plurality of ribs 99. The outer rim 98 contacts the bottom edge of the nut housing 82 and the ribs 99 contact the inner surface of the nut housing in an interference fit when the cap 94 is positioned within the nut housing 82.

The nut housing 82 houses an upper compression coil spring 86, nut 90 and a lower compression coil spring 88. Although compression coil springs are used, other types of springs, such as a rubber cylinders, may alternatively be used in the nut housing. As illustrated in FIG. 10, spring 86 is positioned above the nut 90 and spring 88 is positioned below the nut 90 in the nut housing 82. The top end of the upper compression spring 86 engages the annular shoulder 81 of cylindrical inner passage 83, as indicated at 101. The inner diameter opening 96 at the top of the cap 94 is large enough to accommodate spring 88. The outer diameter opening 97 at the bottom of the cap, however, is sized only large enough to receive the center rod 50 and, as a result, the cap engages the bottom of the lower compression spring 88.

The nut 90 includes two keys 92a and 92b that protrude outwardly from its outer surface. The keys 92 are rectangular in shape and extend vertically from the top of the nut to the bottom of the nut. The nut 90 is positioned within the nut housing 82 such that the keys 92 of the nut 90 align within the vertical slots 93*a* and 93*b* formed by extending portions 84*a* and 84*b* of the nut housing 82.

In use, the nut 90 travels vertically within the passage 83 of the nut housing 82. The slots 93*a* and 93*b* limit the movement of the nut 90 to a vertical direction over a limited distance within the nut housing 82. This prohibits the nut 90 from rotating with respect to the nut housing 82. As a result, when the nut housing 82 is rotated by gear 64*c* of the gear assembly 60, the nut 90 rotates with the nut housing 82. As an alternative to keys 92*a* and 92*b* and slots 93*a* and 93*b*, the nut and inner passage of the nut housing may feature a variety of corresponding shapes as long as the vertical movement of the nut is restricted and rotational movement of the nut relative to the nut hosing 82 is prevented.

As illustrated in FIGS. 9 and 10, the inner surface of the nut 90 includes annular threads 91. As shown in FIGS. 4 and 5, the annular threads 91 are sized to engage the threads 52 of the center rod 50. When the nut 90 rotates, the threads 52 of the center rod 50 cause the center rod 50 to advance out of the nut housing 82 or, when the rotational direction of the nut is reversed, retract back into the nut housing 82. As previously discussed, the end 53 of the center rod 50 opposite of the end to which the plunger 54 is attached is threaded. The center rod 50 does not include any means for restricting travel of the nut 90 along the center rod 50. As a result, the nut 90 travels off of the end of the center rod 50 when the barrel cap 41 is removed and the center rod 50 and plunger 54 are fully extended.

In operation, the user presses either button 110 or button 112 to activate the automatic cookie press. The button 110 is an advance or dispense button which, when depressed, advances the center rod 50 out of the housing 30 so that plunger 54 is pushed towards cap 41. The button 112 is a retract button which, when depressed, reverses the motor so that the center rod 50 is retracted back into the housing of the automatic cookie press.

To prepare the invention for dispensing cookie dough, the retract button 112 is pressed so that the center rod 50 is fully retracted into the nut housing 82. As this occurs, the nut travels off of the bottom of the threads and then turns freely on the lower non-threaded portion 132 of the rod (FIG. 6). This arrangement prevents the nut from jamming on the threads when the rod is fully retracted and prevents damage to the device in the event that the user continues to press the retract button. With reference to FIG. 10, the lower compression spring 88 urges the nut 90 up towards the bottom edge of the threads of the rod. As a result, when the user reverses the motor, that is, presses the advance button 110, the nut readily engages the threads of the rod so that the rod may be transported downwards.

With the rod and piston fully retracted, the barrel cap 41 and disc 44 are removed so that the bore 39 of the barrel 40 may be filled with the cookie dough that is to be dispensed. After the barrel 40 is loaded, and the barrel cap 41 and disc 44 are in place, the advance button 110 is pressed. As the center rod 50 and plunger 54 are advanced, the plunger 54 pushes the cookie dough out of the barrel 40 through the disc openings 46.

When the cookie dough supply is exhausted, the plunger comes to rest either against the barrel cap or near the barrel cap, the latter being the case in that in actual use, at the end of dispensing, a small amount of cookie dough may remain in the barrel between the plunger and the bottom cap. As this occurs, the nut travels off of the end of the threads of the rod and then turns freely on the upper non-threaded portion of the rod 134 (FIG. 6). As a result, the nut is prevented from jamming on the threads and the device is not damaged in the event that the user continues to press the advance button. With reference to FIG. 10, the upper compression spring 86 urges the nut 90 down towards the top edge of the threads of the rod. As a result, when the retract button 110 is pressed, the nut readily engages the threads of the rod so that the rod may be retracted and the device prepared for reuse. More specifically, the automatic cookie press may be prepared or refilled by retracting the center rod 50 and plunger 54 into the nut housing 82 and refilling the barrel 40 with cookie dough.

As an alternative to retracting the rod, the bottom cap 41 (FIGS. 4 and 5) may be removed and the plunger and rod pulled out of the barrel so that these components of the device, along with the barrel, may be cleaned prior to reuse.

While the preferred embodiments of the invention have been shown and described, it will be apparent to those skilled in the art that changes and modifications may be made therein without departing from the spirit of the invention, the scope of which is defined by the appended claims.

We claim:

1. An apparatus for dispensing a food substance, said apparatus comprising:
    a) a housing;
    b) a barrel connected to the housing and adapted to receive the food substance;
    c) a plunger slidably positioned within the barrel;
    d) a rod having threads thereon and connected to the plunger;
    e) a nut housing rotatably positioned within the housing and having an inner passage;
    f) a nut engaging the threads of the rod and positioned within the inner passage of the nut housing;
    g) means for restricting movement of the nut relative to the nut housing to limited vertical travel so that the nut rotates with the nut housing; and
    h) a drive mechanism rotating the nut housing so that the rod moves the plunger so that the food substance is forced out of the barrel.

2. The apparatus of claim 1, further comprising first spring positioned adjacent to the nut in the inner passage of the nut housing so that when the nut travels off of the threads of the rod, the spring urges the nut towards engagement with the threads of the rod.

3. The apparatus of claim 2, wherein the spring is a coil spring.

4. The apparatus of claim 2, wherein the first spring is a compression spring positioned above the nut.

5. The apparatus of claim 4, further comprising a second spring, wherein the second spring is a compression spring positioned below the nut in the inner passage of the nut housing.

6. The apparatus of claim 1, wherein the means for restricting movement of the nut relative to the nut housing includes at least one slot formed in its inner passage and the nut has at least one outwardly extending key, wherein the slot of the nut housing receives the outwardly extending key of the nut.

7. The apparatus of claim 1, wherein the drive mechanism includes a gear assembly having at least one gear and a dual-direction electric motor, wherein the nut housing is disposed adjacent to the gear assembly, whereby the motor rotates the gears and the gear assembly rotates the nut housing.

8. The apparatus of claim 1, wherein the barrel has a bore having a square cross-section and the plunger has a square cross section so that the plunger is prevented from rotating within the barrel.

9. The apparatus of claim 1, wherein the housing includes a button in communication with the drive mechanism so that the drive mechanism is activated and the rod and plunger are advanced in the barrel when the button is engaged by a user.

10. The apparatus of claim 1, wherein the housing includes a button in communication with the drive mechanism so the drive mechanism is activated and the rod and plunger are retracted into the barrel when the button is engaged by a user.

11. The apparatus of claim 1, further comprising a cap removably attached to the bottom of the barrel.

12. The apparatus of claim 11, further comprising a disc having openings that form a template disposed within the cap.

13. An apparatus for dispensing a food substance, said apparatus comprising:
   a) a housing;
   b) a barrel attached to the housing and adapted to receive the food substance;
   c) a plunger for engaging the food substance slidably positioned within the barrel;
   d) a rod attached to the plunger; and
   e) means for advancing the rod disposed within the housing, said means for advancing including:
      i) a nut housing having an inner passage;
      ii) a nut disposed within the inner passage of the nut housing and engaging the rod.

14. The apparatus of claim 13 further comprising a spring disposed within the inner passage of the nut housing and engaging both the nut and the nut housing.

15. The apparatus of claim 14, wherein the rod includes threads and the nut engages the threads of the rod such that the nut may travel off of the threads of the rod where upon the spring forces the nut towards engagement with the threads on the rod.

16. The apparatus of claim 13, wherein the means for advancing includes a means for restricting movement of the nut relative to the nut housing to limited vertical travel of the nut.

17. The apparatus of claim 13, wherein the barrel includes a bore having a square cross section for prohibiting the plunger from rotating within the barrel.

18. The apparatus of claim 13, wherein the barrel includes a template positioned at an end of the barrel for shaping the food substance that is dispensed.

19. The apparatus of claim 13, wherein the means for advancing includes a gear assembly having at least one gear and a dual-direction electric motor, wherein the nut housing is engaged by the gear assembly so that the motor rotates the gears and the nut housing.

20. The apparatus of claim 13, wherein the nut housing has at least one slot formed in its inner passage and the nut has at least one outwardly extending key, wherein the slot of the nut housing receives the outwardly extending key of the nut.

* * * * *